April 12, 1966   HIRONOSUKE IKEDA ETAL   3,245,837
HERMETICALLY SEALED STORAGE BATTERIES
Filed April 11, 1963   3 Sheets-Sheet 1

United States Patent Office 3,245,837
Patented Apr. 12, 1966

3,245,837
HERMETICALLY SEALED STORAGE BATTERIES
Hironosuke Ikeda, Hirakata-shi, and Yasuo Ohira, Kobe, Japan, assignors to Sanyo Electric Co., Ltd., Moriguchi-shi, Japan, a corporation of Japan
Filed Apr. 11, 1963, Ser. No. 272,455
Claims priority, application Japan, Apr. 26, 1962, 37/21,752; Feb. 2, 1963, 38/6,469
5 Claims. (Cl. 136—134)

This invention relates to hermetically sealed electrical storage batteries having positive and negative electrode plates disposed in concentric relations.

In general, a hermetically sealed storage battery of prior art comprising positive and negative cylindrical electrodes disposed concentrically has its innermost electrode in the form of a solid columnar cylinder of unity or split type. With such a construction, the active materials in the central portion of the battery cannot be utilized in full or at high efficiency. Particularly, in such a battery, it is difficult to obtain a necessary degree of diffusion of internally generated gas towards the opposing electrode generally required for the reactional consumption of such gas, resulting in useless existence of active materials in the central portion. Moreover, it is required to apply ample external force on the outer casing of the battery after having hermetically sealed the open end thereof for causing portions of the casing to displace radially inwardly, thus providing positive contact between the electrodes as well as between the casing and the outermost electrode.

Accordingly, it is the primary object of this invention to provide electrical storage batteries of the kind specified which can easily be assembled, with good electrical contact between electrodes as well as between outer casings and cooperating electrodes, and a simple manner of connection of terminal elements to the central electrodes.

Another object of this invention is to provide a method of assembling a storage battery of the kind specified for accomplishing good electrical contact between various elements.

According to this invention, there is provided a hermetically sealed electrical storage battery comprising a hollow cylindrical metallic casing, an electrolyte contained therein, a plurality of hollow cylindrical, positive and negative, electrodes disposed concentrically and alternately within said casing, the outermost electrode being in electrical contact with said casing, a barrier layer interposed between each adjacent pair of said electrodes, each of said hollow cylindrical electrodes being composed of a plurality of part-cylindrical elements, a resilient and electrically conductive metal strip bent into V-shape at the central portion for providing two legs tending to expand outwardly, a terminal element secured to the bent corner of said strip, and a cover plate of electrically insulating material having a central perforation therethrough for receiving therein said terminal element, the legs of said V-bent strip being press fitted into the central bore defined inside the innermost hollow cylindrical electrode, and said cover plate providing hermetical seal of said casing.

There are other objects and particularities of this invention which will be made obvious in the following description with reference to the accompanying drawings, in which:

FIG. 1b is a cross-sectional view of the battery shown in FIG. 1a, the section being taken at line I—I in FIG. 1a;

FIG. 2b is a cross-sectional view taken along line II—II in FIG. 2a;

FIG. 3 is a perspective view showing a V-bent resilient strip secured to a cover plate with a terminal element shown in FIGS. 1a and 2a;

FIG. 4b is a cross-sectional view taken along line IV—IV in FIG. 4a;

FIG. 5a is an elevational view, partly in section, of a modification of the embodiment shown in FIG. 4a;

FIG. 5b is a cross-sectional view taken along line V—V in FIG. 5a;

FIG. 6 is a perspective view showing a V-bent resilient strip secured to a cover plate shown in FIGS. 4a and 5a;

Figure 1A:
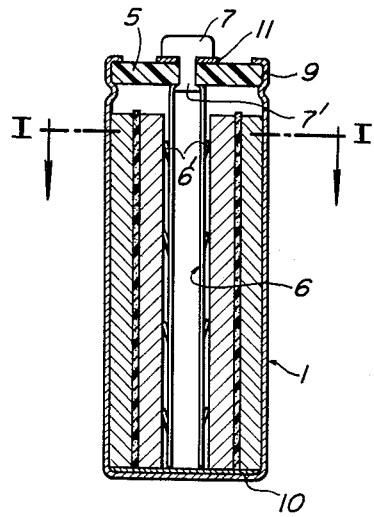
FIG. 1a is a vertical sectional view of a storage battery embodying the invention.
Figure 1B:
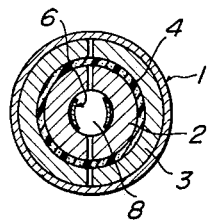

Now referring to FIGS. 1a and 1b, the storage battery is of generally cylindrical configuration comprising an outer casing 1 of hollow cylindrical form made of nickel-plated steel sheet. Within the casing 1 are concentrically disposed positive and negative electrodes 2 and 3. Each electrode is in the form of a hollow cylinder and composed of a plurality of identical parts of part-cylindrical form, all such parts conjointly forming a hollow cylindrical electrode. In the embodiment shown, two semi-cylindrical parts are disposed in opposition to each other to thereby form a hollow cylindrical electrode.

Between the two electrodes 2 and 3 is interposed a barrier layer, or separator 4 consisting of synthetic resin fibre mat impregnated with an electrolytic solution. The whole assembly so formed is enclosed within the casing 1.

Figure 3:
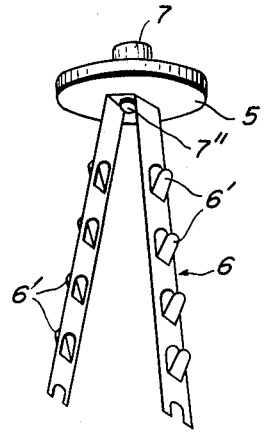

A cover plate 5 of synthetic resin, which serves to provide insulating and packing seal for the open end of the casing 1, is provided with a central perforation through which an external terminal element 7 is inserted. The terminal element 7 provides for electrical connection with a V-bent resilient strip 6 of electrically conducting material which may be nickel-plated steel. The resilient strip 6 is bent into a reverse V-shape comprising a substantially flat top portion of short length and two leg portions diverging downwardly therefrom. An integral construction of the cover plate 5 and the resilient strip 6 is completed by means of the terminal element 7, the shank portion 7' of which passes through the flat top portion of the resilient strip 6 and caulked at the lower end 7" thereof to provide firm connection with the cover plate 5 interposed between the head and the caulked end of the element 7, as shown in FIG. 3.

The inner electrode 2 defines thereinside a central bore 8 into which the V-bent strip 6 connected in unison with the cover plate 5 is press fitted. The resilient strip 6 with its leg portions tending to expand outwardly by its resiliency acts to apply radial force of pressure contact between electrodes as well as casing 1, thus providing good electrical contact between the outer electrode 3 and the casing 1 as well as between the two electrodes 2 and 3.

Preferably, the resilient strip 6 may be formed with a plurality of integral flaps 6' cut therefrom, which are flared outwardly at the upper ends in slanted relation with respect to each leg portion proper. They are distributed along each leg portion with substantially equal spacings. By this, the pressure-fitting of the resilient strip 6 into the central bore 8 will readily be effected, and better electrical contact may thereby be provided.

After the unity construction comprising the resilient strip 6, the cover plate 5, and the terminal element 7 has been set in position in the central bore 8, the end edge 9 of casing 1 is bent around the cover plate 5 for providing hermetical seal therearound.

Figure 2B:
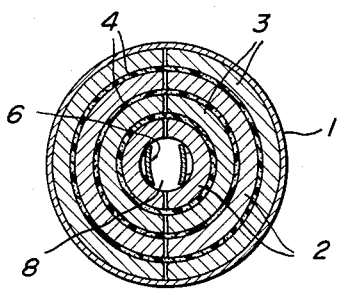
Figure 2A:
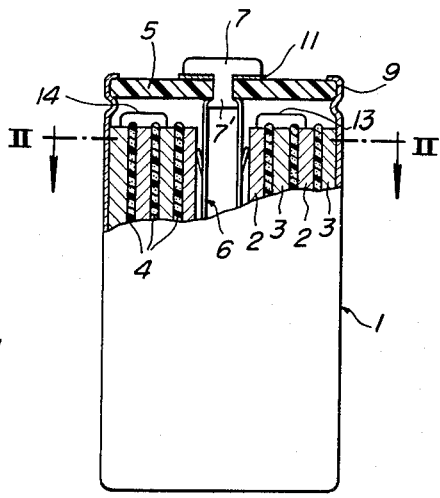
FIG. 2a is an elevational view, partly in section, of another embodiment of the invention.

In FIGS. 2a and 2b, a storage battery of a larger size is shown, and comprises a plurality of concentric positive electrodes and the same number of concentric negative electrodes. In this case, positive and negative electrodes 2 and 3 are disposed alternately, with respective barrier layers or separators 4 interposed therebetween. Each hollow cylindrical electrode is composed of a plurality of, say two, part-cylindrical or semi-cylindrical elements.

The innermost electrode 2 defines thereinside a central bore 8 into which a V-bent resilient strip 6 is press fitted to provide ample contact pressure between electrodes as well as between the outermost electrode and the casing 1, just as in FIGS. 1a and 1b. The resilient strip 6 is likewise connected with a terminal element 7 with a cover plate 5 held thereby, and the cover plate 5 is hermetically sealed with the casing 1.

In each of the two embodiments hereinbefore described, an insulating disc 10 is disposed flat on the bottom surface of the casing 1;

Further, a packing collar 11 of resilient synthetic resin is provided between the cover plate 5 and the enlarged head of the terminal element 7.

Figure 4A:
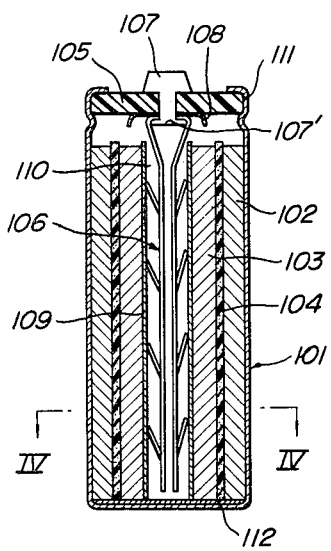
FIG. 4a is a vertical sectional view of still another embodiment of the invention.
Figure 4B:
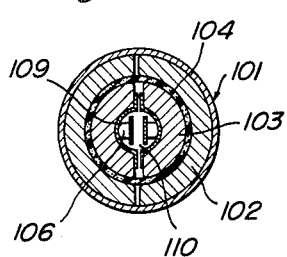

In the embodiment shown in FIGS. 4a and 4b, the storage battery is of generally cylindrical configuration comprising a casing 101 of hollow cylindrical form made of nickel-plated steel sheet. Within the casing 101 are concentrically disposed positive and negative electrodes 103 and 102. Each electrode is of a hollow cylindrical form and composed of a plurality of identical elements of part-cylindrical form, as in the case of the embodiment shown in FIGS. 1a and 1b. In the embodiment herein shown, two semicylindrical elements are disposed in opposition to each other to thereby form a hollow cylindrical electrode.

Between the two electrodes 102 and 103 is interposed a barrier layer or separator 104 which may be of synthetic resin fibre mat impregnated with an electrolytic solution of caustic potash. The whole assembly so formed is enclosed within the casing 101.

A cover plate 105 of synthetic resin such as polyethylene of the like serves to provide insulating and packing seal for the open end of the casing 101, and is provided with a central perforation through which an external terminal element 107 is inserted. The terminal element 107 provides for electrical connection with a resiliently expandable strip 106 made of electrically conductive material which may be nickel-plated steel. The resilient strip 106 is bent into substantially U-shape at the central portion with its two legs tending to expand outwardly. The short and flat top portion of the U-bent strip 106 provides for connection with the terminal elements 107. The resilient strip 106 and the cover plate 105 with a cup-like resinforcement disc 108 interposed therebetween are united together by means of the terminal element 107, the shank portion of the element 107 passing through the cover plate 105 and the flat top portion of the resilient strip 106, and the lower end 107′ of the element 107 being caulked onto the strip 106.

Figure 6:
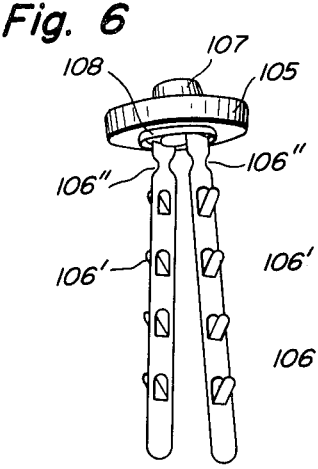
Figure 7A:
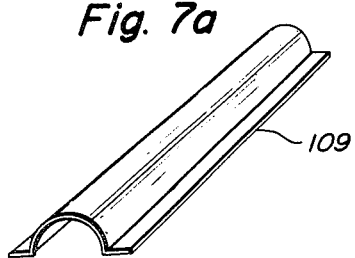
FIG. 7a is a perspective view of a part-cylindrical element of a guide sleeve of non-perforated type.
Figure 7C:
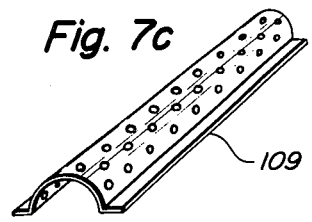
FIG. 7c is a perspective view of a part-cylindrical element of a guide sleeve of perforated type.
Figure 7B:
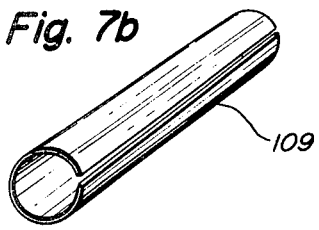
FIG. 7b is a perspective view of a guide sleeve of non-perforated type as rolled into a split tube.
Figure 7D:
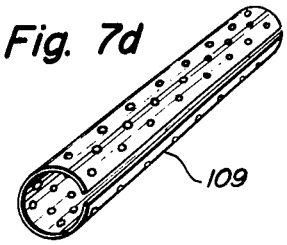
FIG. 7d is a perspective view of a guide sleeve of perforated type as rolled into a split tube.

Preferably, the resilient strip 106 may be formed with a plurality of integral flaps 106′ on along the two legs. These flaps are cut from the strip with lower ends continuous therewith and upper ends flaring outwardly as shown in FIG. 6. The flaps 106′ thus provide additional resiliency for the strip 106 to afford ample contact pressure for the electrodes and the casing 101. Constricted portions 106″ may be formed at the upper end portions of the legs to reduce the resiliency threat so that the flaps 106′ may provide major portion of the resilient action.

The inner electrode 103 defines thereinside a central bore 110 into which a guide sleeve 109 of thin metal sheet is inserted. The guide sleeve 109 may be of a nickel-plated steel sheet and may or may not be provided with a larger number of small perforations as shown in FIGS. 7a, 7b, 7c and 7d. The guide sleeve 109 may be in the form of a split tube rolled from such a sheet so as to make close fit within the central bore 110, or may be composed of a plurality of part-cylindrical sections, preferably of the same number with that of the part-cylindrical elements of the inner electrode 103, which sections are flanged at both lateral edges and adapted to contact the inner surfaces of the inner electrode elements, respectively, with the lateral flanges held between the electrode elements. The sleeve 109 serves as a slide guide for the resilient strip 106 when it is inserted into the bore 110, and prevents any scraping-off of the active material of electrode 103.

When the unit assembly comprising the resilient strip 106, the cover plate 105 and the contact element 107 are inserted into the guide sleeve 109 pre-inserted within the central bore 110, the resilient strip 106, with integral flaps 106′ pressing the sleeve outwardly to enlarge the latter, provides ample contact pressure between the electrodes, as well as between the outer electrode 102 and the casing 101. The upper end edge 111 of the casing 101 is bent on around the cover plate 105 to complete the hermetical sealing.

Figure 5A:
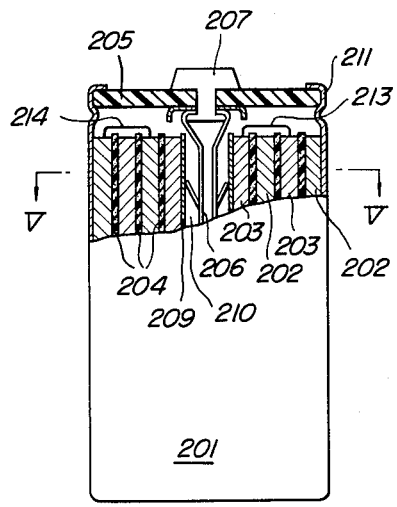
Figure 5B:
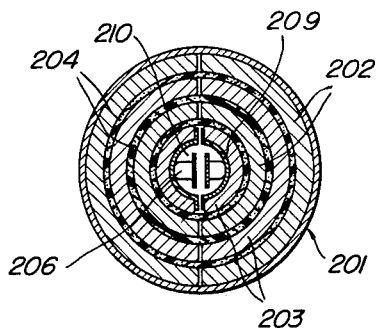

In FIGS. 5a and 5b, a storage battery of larger size is shown, and comprises a plurality of concentric positive electrodes 203 and the same number of concentric negative electrodes 202 disposed within a hollow cylindrical casing 201. In the embodiment shown, hollow cylindrical positive and negative electrodes 203 and 202 are disposed alternately, with respective barrier layers 204 disposed therebetween. Each electrode is composed of a plurality of part-cylindrical elements, e.g. semi-cylindrical elements in this case. The innermost electrode 203 defines thereinside a central bore 210 into which a guide sleeve 209 is inserted. The guide sleeve 209 is just what has been described in connection with the embodiment of FIG. 4a.

A resilient strip 206 is just as the one explained and shown in connection with FIG. 6, and may likewise be provided with integral flaps and constricted portions. The resilient strip 206 is united together with a cover plate 205 and a terminal element 207, and the U-bent strip 206 is press fitted into the guide sleeve 209. The open-end edge 211 is caulked on around the cover plate 205 to complete the hermetical sealing.

Referring to FIG. 4a, an insulating disc 112 is disposed flat on the bottom surface of the casing 101. Although such insulating disc is not shown in FIG. 5a, it will be obvious that a similar disc is to be provided on the bottom surface of the casing 201. In FIGS. 2a and 5a, it will be noted that two connector wires 13, 14 and 213, 214 are respectively provided to furnish electrical connection between the pairs of electrodes 2 and 3, and 202 and 203, respectively.

The positive and negative electrodes may be of either sintered or compressed type. Sintered electrode elements may be formed in part-cylindrical shape by nickel or carbonyl-nickel powders which are sintered and held on base networks of nickel wires or nickel-plated perforated plates embedded in the sintered bodies. The active materials are impregnated into the sintered bodies, cadmium salts into the cathodes and nickel salts into the anodes. In case of compressed electrode elements, cathode elements are moulded under pressure from a mixture of cadmium hydrate and carbon or like conducting material in powdered form, while anode elements are from a mixture of powdered nickel hydrate and carbon or like conducting material. Nickel-plated metal screens may be used as protective coverings for the compressed electrode elements. These electrode elements are impregnated with electrolytic solution of caustic potash before being assembled into the battery.

The electrode elements are activated and formed in a conventional manner. Since the formation per se of cathodes and anodes as well as of the electrolyte do not constitute the essential features of this invention, any further description thereon will not be necessary.

What we claim is:

1. A hermetically sealed electrical storage battery comprising:

a hollow metallic outer case closed at one end and having an electrolyte therein, a plurality of hollow positive and negative electrodes of the same general shape as said case and disposed concentrically and alternately therein; each said electrode split along its longitudinal axis and formed of a plurality of parts, a barrier layer interposed between two adjacent electrodes, a strip of conductive and resilent material formed in a generally V-shape with a plurality of legs which tend to expand outwardly, said legs being located in the bore defined by the parts of the innermost hollow electrode whereby said legs expand outwardly to make electrical contact with parts of the innermost electrode and force these parts transversely of the longitudinal axis of the case to exert a force to move the parts of the outermost electrode into electrical contact with said case, said legs of said resilient strips also having a plurality of outwardly extending flaps to make electrical contact with the parts of the innermost electrode, a cover plate of insulating material for sealing the other end of said case, a terminal on said cover plate, and means within said case and electrically connected to said terminal for holding said resilient strip.

2. A hermetically sealed electric storage battery as set forth in claim 1 and further comprising an expandable guide sleeve of electrically conductive material inserted in said bore between the inner wall thereof and the legs of the resilient strip.

3. A hermetically sealed storage battery as set forth in claim 2 wherein said guide sleeve has a plurality of openings therein.

4. A hermetically sealed storage battery as set forth in claim 2 wherein said guide sleeve is split along the length thereof to form a number of parts which are forced into contact with the parts of said innermost electrode by the legs of said resilient strip.

5. A hermetically sealed storage battery as set forth in claim 4 wherein said guide sleeve has a plurality of openings therein.

References Cited by the Examiner

UNITED STATES PATENTS 3,069,485  12/1962  Winger et al. _____ 136—134
3,116,172  12/1963  Wilke et al. _____ 136—134

WINSTON A. DOUGLAS, *Primary Examiner.*

JOHN H. MACK, *Examiner.*